(12) United States Patent
Ragan

(10) Patent No.: US 11,873,171 B2
(45) Date of Patent: Jan. 16, 2024

(54) CONVEYOR SCRUBBING SYSTEM

(71) Applicant: Laitram, L.L.C., Harahan, LA (US)

(72) Inventor: Bryant G. Ragan, Metairie, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 17/779,665

(22) PCT Filed: Dec. 14, 2020

(86) PCT No.: PCT/US2020/064783
§ 371 (c)(1),
(2) Date: May 25, 2022

(87) PCT Pub. No.: WO2021/126737
PCT Pub. Date: Jun. 24, 2021

(65) Prior Publication Data
US 2023/0011655 A1    Jan. 12, 2023

Related U.S. Application Data

(60) Provisional application No. 62/948,659, filed on Dec. 16, 2019.

(51) Int. Cl.
*B65G 45/24* (2006.01)
*B65G 45/18* (2006.01)
*B65G 45/22* (2006.01)
*B65G 54/02* (2006.01)

(52) U.S. Cl.
CPC ............ *B65G 45/24* (2013.01); *B65G 45/18* (2013.01); *B65G 45/22* (2013.01); *B65G 54/02* (2013.01)

(58) Field of Classification Search
CPC ........ B65G 45/24; B65G 45/18; B65G 45/22; B65G 54/02
See application file for complete search history.

(56) References Cited

U.S. PATENT DOCUMENTS

| | | | | |
|---|---|---|---|---|
| 2,915,019 A | * | 12/1959 | Tieman | B65G 9/00 15/246 |
| 3,249,211 A | * | 5/1966 | Gray | B65G 45/10 104/279 |
| 4,230,045 A | | 10/1980 | Fearon | |
| 5,303,656 A | | 4/1994 | Makimura et al. | |
| 5,746,302 A | | 5/1998 | Bowman | |
| 6,478,115 B1 | * | 11/2002 | Wech | B65G 45/08 184/15.2 |

(Continued)

FOREIGN PATENT DOCUMENTS

| | | |
|---|---|---|
| DE | 1658396 A1 | 7/1970 |
| DE | 102010013364 A1 | 10/2011 |

(Continued)

*Primary Examiner* — Mark A Deuble
(74) *Attorney, Agent, or Firm* — James T. Cronvich

(57) ABSTRACT

A conveyor-rail cleaner for cleansing, scrubbing, and rinsing the rails of a cleanable conveyor system. The cleaner includes cleaning units pivotably connected to allow it to negotiate turns in the track. Position-adjustable scrub brushes accommodate transitions between one-rail conveyor segments and two-rail segments at switch segments between separate adjacent conveyor tracks. The conveyor system includes a filling station for filling the cleaning units with cleansing and rinsing agents and recharging batteries powering scrub-brush motors.

19 Claims, 10 Drawing Sheets

(56) References Cited

U.S. PATENT DOCUMENTS

| | | | | |
|---|---|---|---|---|
| 9,676,560 | B2 * | 6/2017 | Senn | B65G 43/00 |
| 2008/0190461 | A1 * | 8/2008 | Thorpe | E01H 8/105 |
| | | | | 15/88.4 |
| 2016/0107844 | A1 * | 4/2016 | Lelie | B65G 54/02 |
| | | | | 198/494 |
| 2016/0194158 | A1 | 7/2016 | Senn | |
| 2020/0102161 | A1 | 4/2020 | Ragan | |
| 2023/0091120 | A1 * | 3/2023 | Hagiwara | A47L 9/281 |
| | | | | 15/319 |

FOREIGN PATENT DOCUMENTS

| | | | | |
|---|---|---|---|---|
| EP | 2487124 | A1 | 8/2012 | |
| GB | 2248813 | A | 4/1992 | |
| GB | 2561969 | A | 10/2018 | |
| KR | 20190054610 | A | 5/2019 | |
| WO | 200073592 | A1 | 12/2000 | |
| WO | 2015036193 | A1 | 3/2015 | |
| WO | 2018236469 | A1 | 12/2018 | |
| WO | WO-2019220272 | A1 * | 11/2019 | B65G 45/12 |

\* cited by examiner

CONVEYOR SCRUBBING SYSTEM

BACKGROUND

The invention relates generally to power-driven conveyors and in particular to cleaning systems for conveyor rails.

Conveyor systems having independently propelled transport units, such as trays or movers, are used to convey articles. In these conveyor systems the transfer units ride atop rails defining a conveying track. One simple configuration might be an oval track. But more complex configurations involving transfers between multiple tracks are also possible. Linear-motor conveyors are one example of a conveyor system in which individual transport units are driven along a track on a rail by a linear motor. One example of a linear-motor conveyor configurable with simple or complex tracks is the ACOPOStrak® Flexible Transport system manufactured by B&R Automation GmbH of Eggelsberg, Austria. Coils in the rails of that system form linear-motor stators. Electric fields produced by the stators interact with the magnetic fields produced by magnets in transport units on the rails to propel the units independently along the track defined by the rails.

In many industries, especially in the food industry, sanitation is important. Dirt and other contaminants that build up on conveyor rails must be cleaned regularly. Usually cleaning is a manual process performed with the conveyor stopped and the transport units removed. So cleaning the conveyor interrupts production.

SUMMARY

A conveyor-rail cleaner embodying features of the invention comprises a first cleaning unit and a second cleaning unit each having a left side and a right side and a first end and a second end. The second ends of the cleaning units are pivotably connected together. The cleaning units have cleaning elements.

A cleanable conveyor system embodying features of the invention comprises a conveyor rail and a conveyor-rail cleaner. The conveyor-rail cleaner includes one or more movers movable along the conveyor rail and one or more cleaning units detachably connected to the one or more movers. The cleaning units have cleaning elements arranged to clean the conveyor rail.

DETAILED DESCRIPTION

Figure 1:
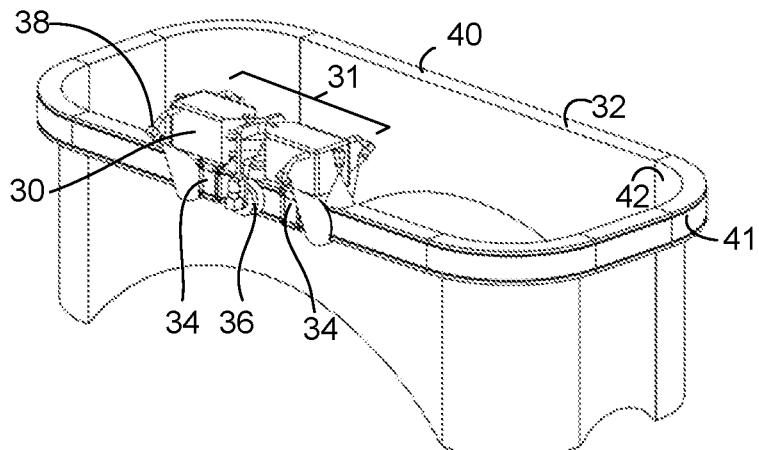
FIG. 1 is an isometric view of one version of a racetrack conveyor being cleaned by a conveyor-rail cleaner embodying features of the invention.

FIG. 1 shows a single-rail track conveyor being cleaned by a conveyor-rail cleaner embodying features of the invention. The conveyor-rail cleaner 30 rides around a closed-circuit rail 32. In this example the rail 32 houses a series of coils that form a linear-motor stator producing electromagnetic flux waves that propel magnetic movers 34, along the rail. One example of such a conveyor is described in U.S. Pat. No. 10,370,195, "Method for Operating a Long Stator Linear Motor," issued to B&R Industrial Automation, GmbH, on Aug. 6, 2019. The disclosure of that patent is incorporated into this application by reference. A cleaning portion 31 of the conveyor-rail cleaner 30 is mounted atop two movers 34. Permanent magnets in the movers produce a magnetic field that interacts with the electromagnetic flux waves of the rail stator to provide a propulsive force to the movers. The conveyor-rail cleaner 30 includes cleaning elements, such as scrub brushes 36 and fluid spray nozzles 38, that clean the top and side 40, 41, 42 surfaces of the rail 32.

Figure 2:
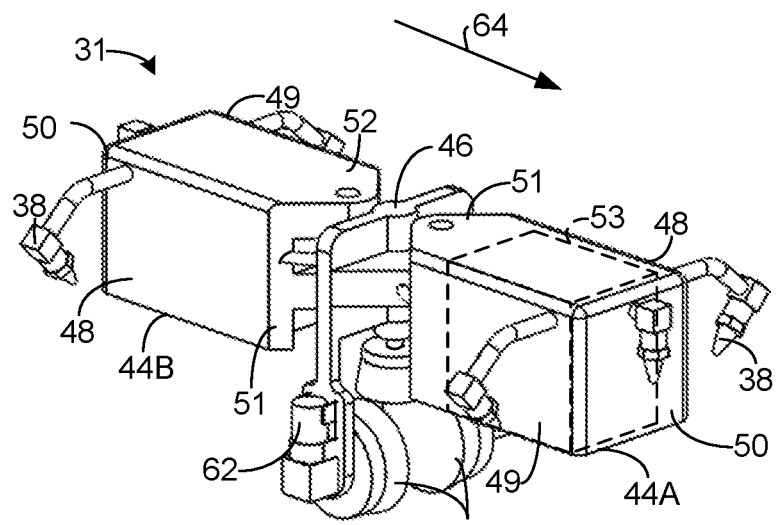
FIG. 2 is an enlarged isometric view of the cleaning portion of the conveyor-rail cleaner of FIG. 1.
Figure 3:
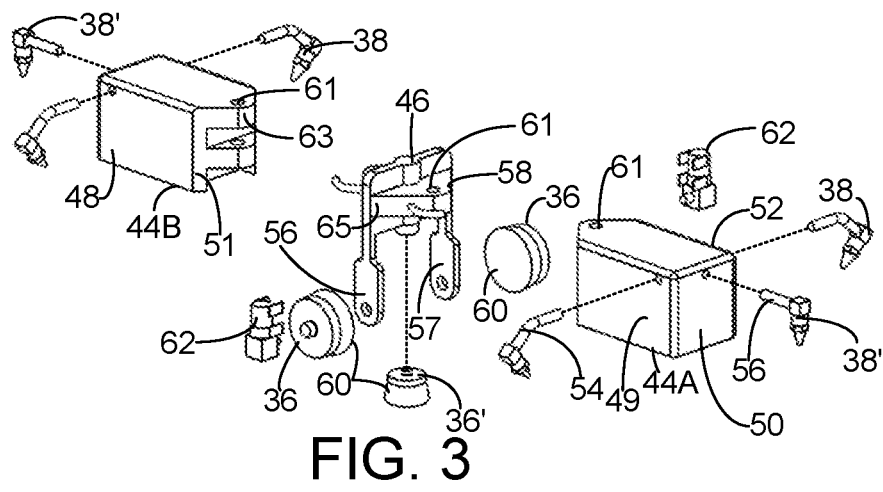
FIG. 3 is an exploded view of the cleaning portion of FIG. 2.

The cleaning portion 31 of the conveyor-rail cleaner 30 is shown in greater detail in FIGS. 2 and 3. The cleaning portion 31 comprises two cleaning units 44A, 44B pivotably connected by an articulation unit 46. Each cleaning unit 44A, 44B has first and second lateral sides 48, 49 and first and second ends 50, 51. The articulation unit 46 pivotably connects the second ends 51 of the two cleaning units 44A, 44B back to back to allow the conveyor-rail cleaner to articulate in the middle to negotiate turns in the conveyor-rail track. Holes 61 through hinge elements 63 at the second ends 51 of the cleaning units 44A, 44B aligned with holes through interlaced hinge elements 65 in the articulation unit 46 receive hinge pins (not shown) to form joints that enable the articulation.

Each cleaning unit 44A, 44B has cleaning elements, such as side fluid nozzles 38 and an end fluid nozzle 38'. The nozzles 38, 38' are in fluid communication with fluid tanks 53 inside a housing 52, which also encloses a fluid pump—another cleaning element. The tanks 53 supply fluid to the fluid nozzles 38, 38'. The side nozzles 38 are attached to bent conduits 54 extending from the tank 53 through the sides 48, 49 of the housing 52. The bent conduits 54 direct the spray from the side nozzles against the sides 41, 42 of the conveyor rail 32 as shown in FIG. 1. The end nozzle 38' is connected to the fluid tank 53 by a conduit 56 extending through the first end 50 of the cleaning unit 44A, 44B. The nozzle is aimed down to spray the top 40 of the rail 32 as shown in FIG. 1. In this example the two cleaning units 44A, 44B are identical in construction, but they could be different.

Scrub brushes 36, 36' are cleaning elements on the articulation unit 46. The side brushes 36 are rotatably mounted to the inside distal ends of arms 56, 57 extending down from a central structure 58 of the articulation unit 46. The brushes' bristles 60 face laterally inward to scrub the sides 41, 42 of the rails 32 as shown in FIG. 1. The central brush 36' is rotatably mounted to the central structure 58 with its bristles 60 facing downward to scrub the top 40 of the rail. The side brushes 36 are driven by motors 62 coupled by a gearbox to the brushes through the arms 56, 57 and attached to the outside distal ends of the arms. The central brush 36' is driven by a motor (not shown) in the central structure 46. The brush motors are electrically connected to batteries (not shown) in the cleaning units 44A, 44B. The batteries also power the pumps for the fluid tanks. If the conveyor-rail cleaner 30 is advancing in the direction 64 indicated by the arrow in FIG. 2, the front cleaning unit 44A would dispense a cleaning agent and the rear cleaning unit 44B would dispense a rinsing agent in a typical application.

The cleaning portion 31 of the conveyor-rail cleaner 30 is removed from the movers 34 by a separation tool in the form of a hoist 66 as shown in FIGS. 4A-4D. The hoist 66 has a horizontal boom 68 cantilevered from a central vertical post 70. A hoist motor 72 attached to the post 70 pays out and draws in a cable 74 from which a magnetic lift 76 is suspended below the end of the boom 68. Pulleys 78 at the ends of the boom 68 guide the cable 74. The magnetic lift 76 has a pair of electromagnets 80 suspended from opposite ends of a frame 82. The electromagnets 80 are spaced apart so that each one can attach to one of the cleaning units 44A, 44B by magnetic attraction. The cleaning units 44A, 44B include ferrous material in or under the top 84 that is attracted by the electromagnets when energized.

Figure 4A:
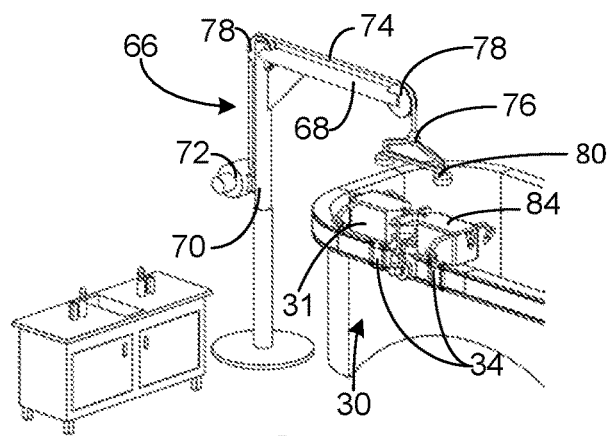
FIGS. 4A-4D illustrate a sequence of steps followed by a hoist transferring the cleaning portion of FIG. 2 from the rail to a remote docking station for charging and filling.
Figure 4B:
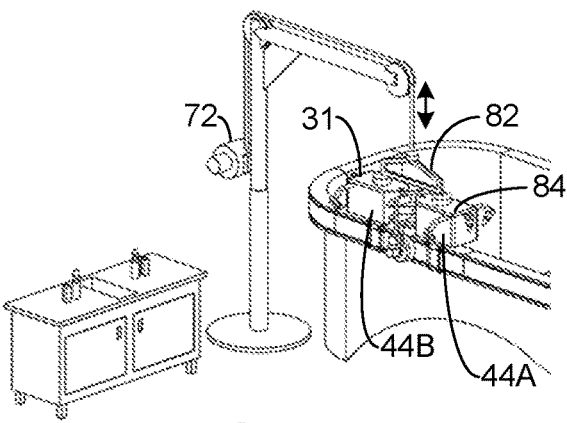
Figure 4C:
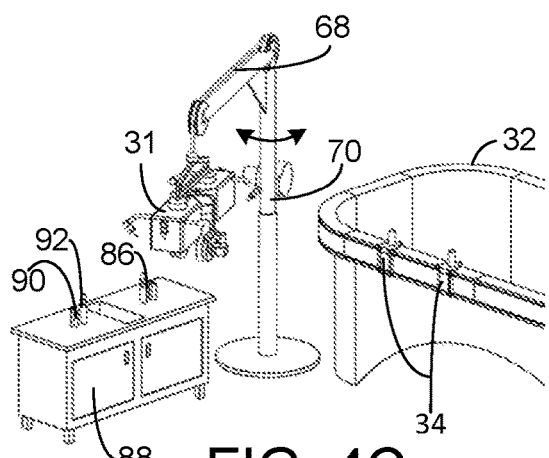
Figure 4D:
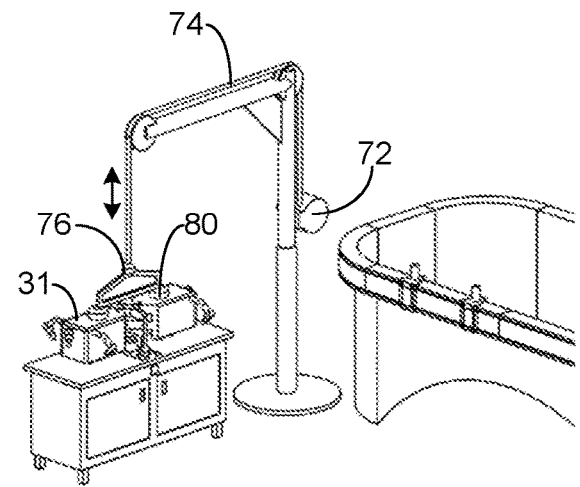

The sequence of removing the cleaning portion 31 from the rail conveyor is shown in FIGS. 4A-4D. With the conveyor-rail cleaner 30 stopped at an unloading point along the rail conveyor, the boom 68 is swung into position above the rail cleaner 30 by rotating the vertical post 70 as shown in FIG. 4A. As shown in FIG. 4B, the hoist motor 72 then pays out the cable 74 until the electromagnets 80 are on or just above the tops 84 of the cleaning units 44A, 44B. The electromagnets 80 are energized to separate the cleaning portion 31 from the movers 34. The boom 68 is then swung away from the conveyor rail 32 by rotating the vertical post 70 as shown in FIG. 4C until the cleaning portion is directly above connections 86 on a docking station 88. Then, as shown in FIG. 4D, the hoist motor 72 pays out the cable 74 to lower the cleaning portion onto the connections 86—electrical charging plugs 90 and fluid injectors 92—extending upward from the docking station 88. The electromagnets 80 are then de-energized, and the magnetic lift 76 raised by the hoist motor 72. Batteries in the cleaning portion 31 are then electrically recharged and the fluid tanks refilled. The recharged and refilled cleaning portion 31 is returned to the conveyor by reversing the sequence.

Figure 5:
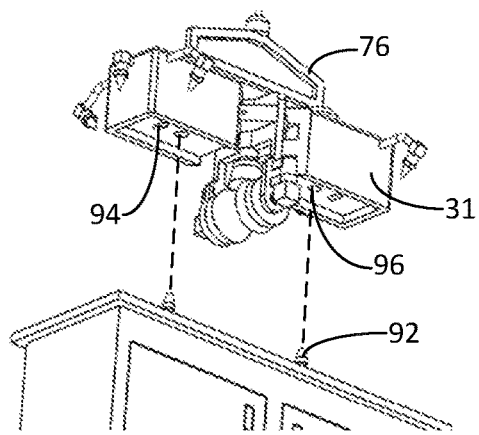
FIG. 5 is an isometric view of the underside of the cleaning portion of FIG. 2.

FIG. 5 shows filling ports 94, 96 in the bottom of the cleaning units 44A, 44B. Sockets 94 receive the battery charging plugs (90, FIG. 4C). Fittings 96 receive the fluid injectors 92 to refill the fluid tanks with cleansing or rinsing fluid.

Figure 6:
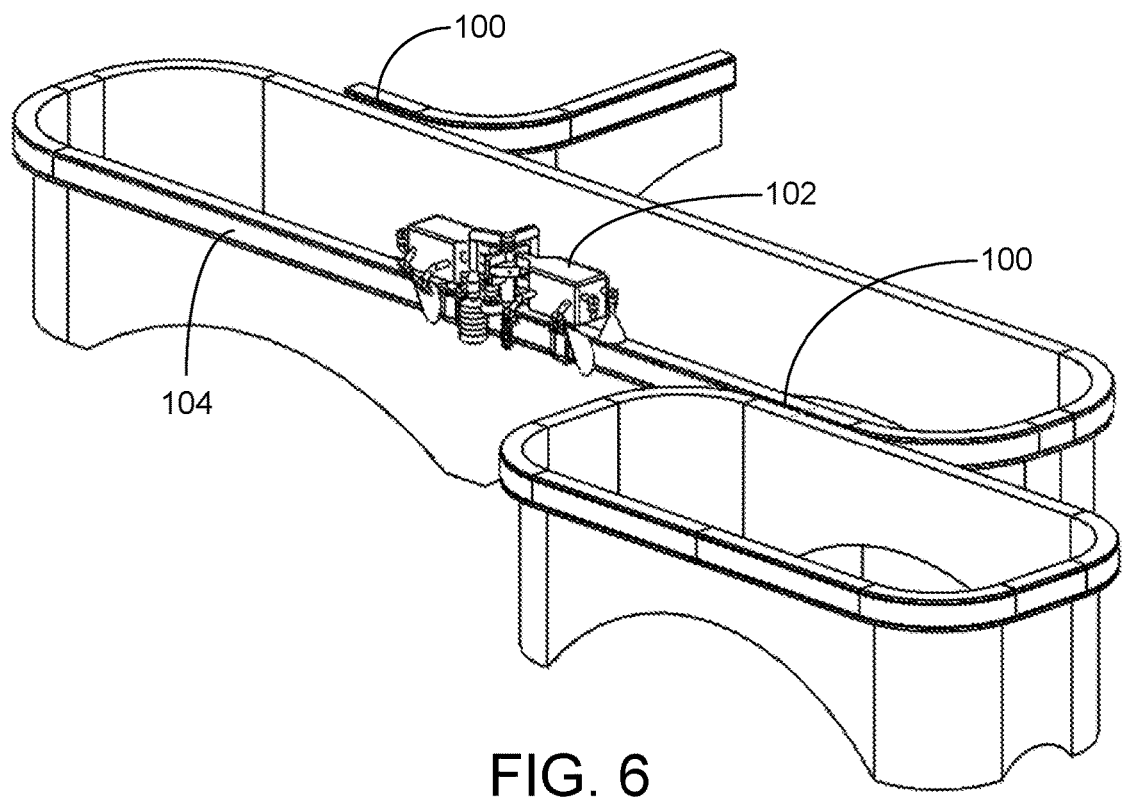
FIG. 6 is an isometric view of a more complex version of a racetrack conveyor being cleaned by another version of a conveyor-rail cleaner embodying features of the invention.

FIG. 6 shows multiple single-rail conveyors as in FIG. 1 with switch sections 100 at which the movers can be selectively switched from one rail section to another. The switch sections 100 are dual-rail conveyor sections. A conveyor-rail cleaner 102 capable of operating on and cleaning dual-rail sections, as well as single-rail sections, rides along the rails 104. The cleaner 102 is shown in more detail in FIG. 7. It is similar in design to the conveyor-rail cleaner 30 of FIG. 1 with cleaning units 108A, 108B pivotably joined by an articulation unit 109, but has additional features enabling it to better clean dual-rail sections 100.

First ends 106 of the cleaning units 108A, 108B have two downwardly directed fluid nozzles 110—one for each rail 104 in a dual-rail section 100. Each lateral side 112, 113 of the cleaning units 108A, 108B has two nozzles 114, 115. The inner nozzle 114 extends by conduit from the side 112 or 113 a lesser distance than the outer nozzle 115. The inner nozzle 114 directs its fluid spray against the side of the rails 104 in a single-rail section and against the interior facing sides of the rails in the gap 116 on dual-rail sections 100. The outer nozzle 115 directs its fluid spray against the other sides 117, 117' of the rails in dual-rail switch sections 100. The inner and outer nozzles 114, 115 can be operated together or independently. Like the cleaning portion 31 of the conveyor-rail cleaner 30 of FIG. 1, the cleaning portion of the dual-rail cleaner 102 of FIG. 7 is attached to movers 118.

Figure 8:
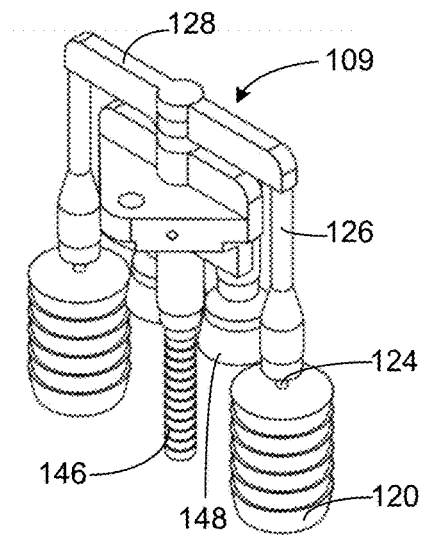
FIG. 8 is an isometric view of an articulation unit in the conveyor-rail cleaner of FIG. 7.
Figure 9:
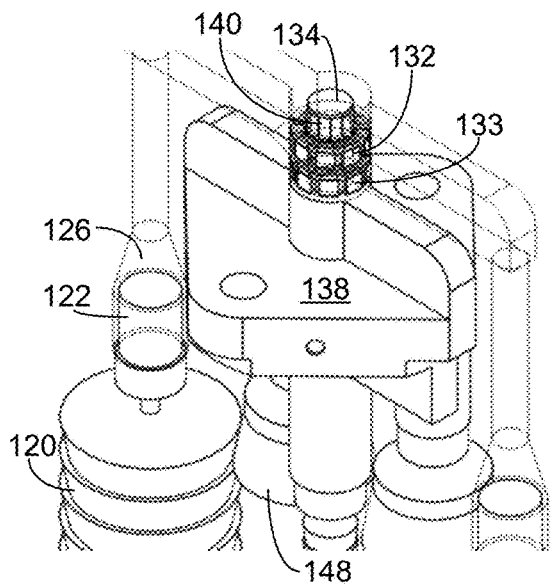
FIG. 9 is an enlarged view of the top portion of the articulation unit of FIG. 8.
Figure 10:
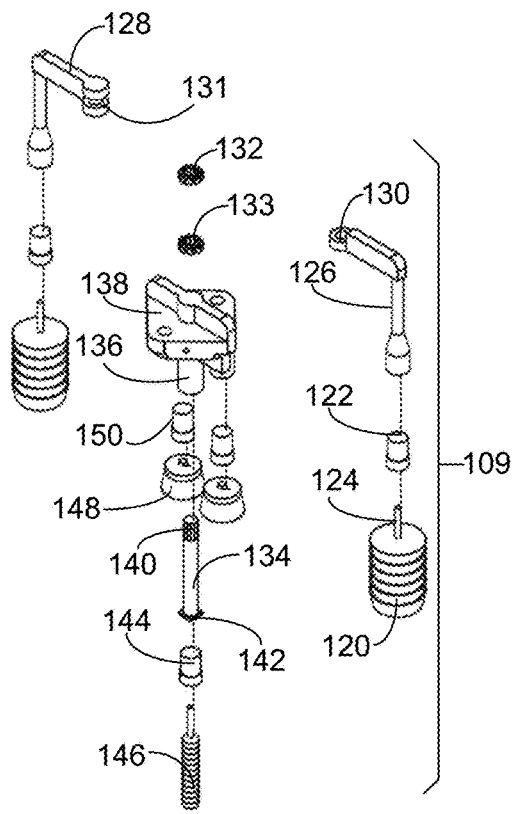
FIG. 10 is an exploded view of the articulation unit of FIG. 8.

The articulation unit 109 is shown in more detail in FIGS. 8-10. Outer side-rail brushes 120 are coupled to motors 122 by shafts 124. The brushes 120 depend from arms 126, which also house the brush motors 122. The arms 126 extend downward from shoulders 128. The ends of the shoulders opposite the arms 126 include pivots 130, 131. Toroidal rotor coils 132, 133 reside in the pivots 130, 131. A central piston 134 extends through a tube 136 in a central structure 138 in the articulation unit 109. A swivel includes permanent magnets 140 at the top end of the piston 134 that form the stators of swivel motors for the side-rail brush arms 126. The rotors 132, 133 of the swivel motors are independently energized to swivel the arms 126 about the pivots 130, 131 so that the side brushes 120 are in position to scrub the sides of the rails. The piston 134 is part of a lift actuator 142 that selectively extends the piston to raise the side brushes 120 to clear obstructing rail portions. The lift actuator 142 extends the piston 134 to raise the side brushes 120 to clear obstructing rail portions. The lift actuator 142 retracts the piston 134 to lower the side brushes 120 into scrubbing positions. A scrub motor 144 for a gap scrub brush 146 is mounted in the central structure 138 below the lift actuator 142. The motor 144 rotates the gap brush 146 to scrub the sides of the rails in the gap in the two-rail section of the conveyor. Rail-top scrub brushes 148 are rotated by motors 150 depending from the central structure 138. The rail-top brushes 148 scrub the tops of the rails.

Figure 7:
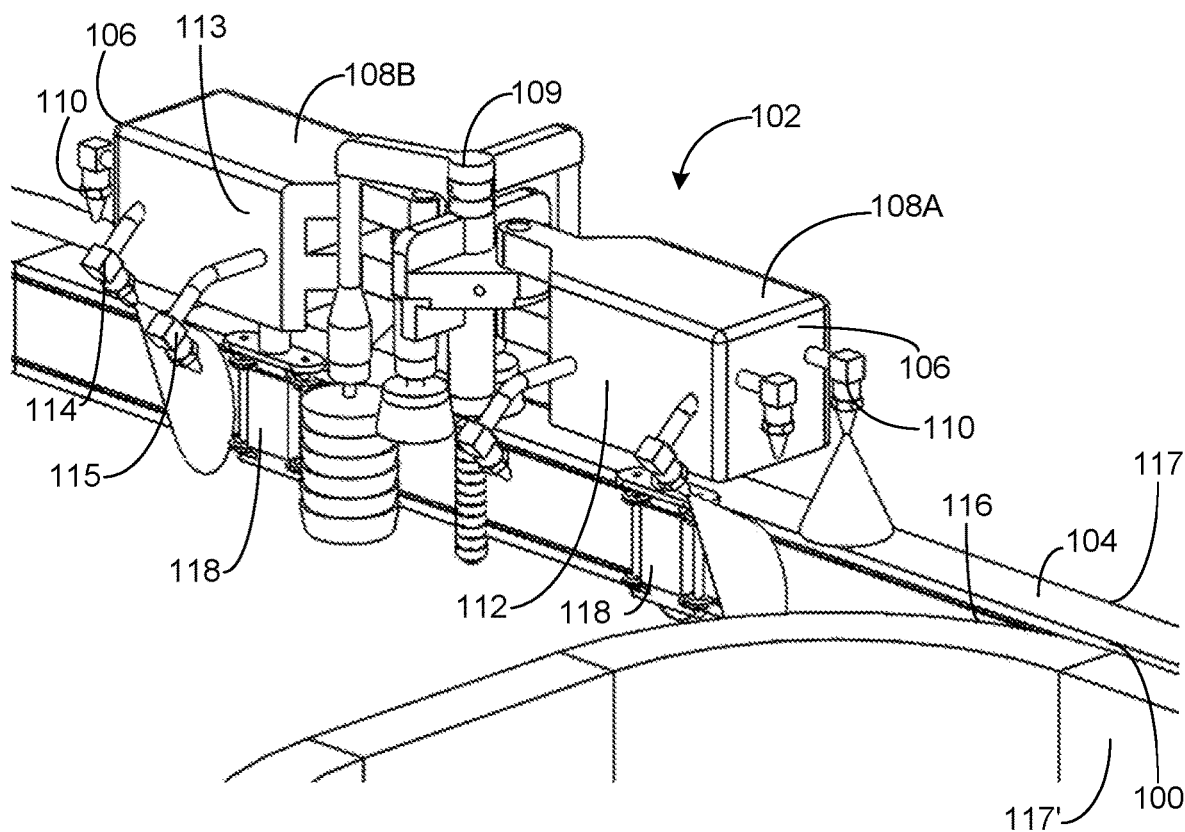
FIG. 7 is an enlarged view of the conveyor-rail cleaner of FIG. 6.
Figure 11:
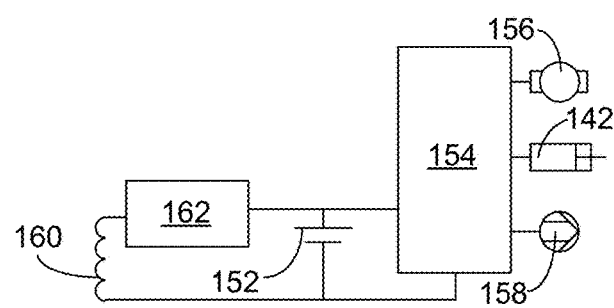
FIG. 11 is a block diagram of one version of an electrical system for the conveyor-rail cleaner of FIG. 7.

Each of the cleaning units of FIG. 2 or FIG. 7 houses power and control circuitry as exemplified by FIG. 11. A battery 152 powers a control device 154, such as a microcontroller or other programmable device. The control device 154 selectively controls the scrub-brush motors (generically, 156), the lift actuator 142, the fluid pumps 158, and other electrically-powered devices. The battery 152 is a rechargeable battery that is recharged at a docking station 88 as in FIG. 4D. The battery 152 is charged inductively through a coil 160 and a charging circuit 162. Alternatively, the battery 152 could be charged through a direct electrical connection rather than inductively. In that case the coil 160 is not needed and the charging circuit could reside in either the cleaning units or the docking station.

Figure 12:
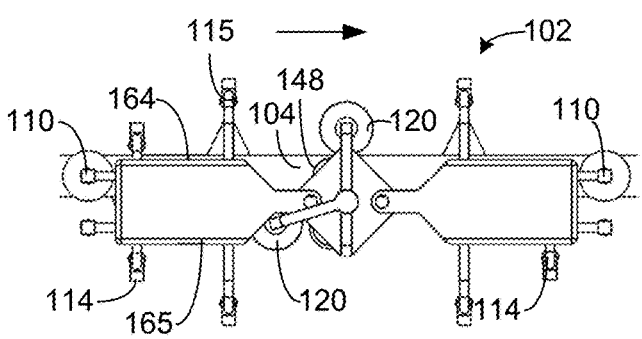
FIG. 12 is a top plan view of the conveyor-rail cleaner of FIG. 7 positioned on the rail as in FIG. 6.

The operation of the dual-rail cleaner 102 on a single-rail section of the conveyor track is shown in FIG. 12. In that circumstance the outer nozzles 115 on the left side 164 of the cleaner 102 are supplied fluid by the pumps to spray the left side of the rail 104. The inner nozzles 114 on the right side 165 of the cleaner 102 are also supplied fluid to spray the right side of the rail 104. The pumps feeding the other inner and outer side nozzles are turned off. The nozzles 110 at the first ends of the cleaning unit on the left side are supplied fluid to wash the top of the rail 104. The pumps for the nozzles 110 on the right side are disabled to conserve fluid. The side scrub brushes 120 are swiveled to the positions shown to scrub both sides of the rail 104. The left top-rail brush 148 is also energized to scrub the top of the rail 104. The right top-rail brush and the gap brush are de-energized.

Figure 13A:
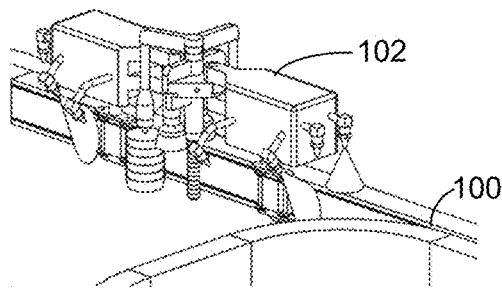
FIGS. 13A-13E illustrate the sequence of switching the conveyor-rail cleaner of FIG. 7 from one track to another.
Figure 13B:
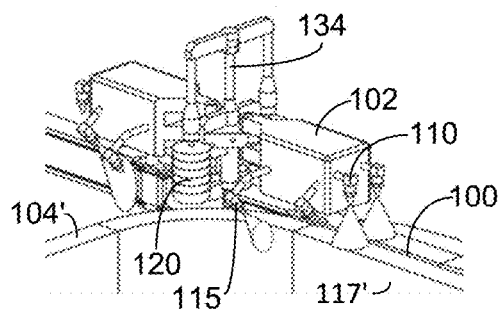

FIGS. 13A-13E depict the sequence of steps taken by the dual-rail cleaner 102 just before and during an encounter with a switch section 100 of a conveyor track. As shown in FIG. 13A, just before entering the switch section 100, the rail cleaner's brushes and nozzles are operating as shown in FIG. 12 and described in the previous paragraph. As the cleaner 102 enters the switch section 100 as shown in FIG. 13B, the lift actuator extends the piston 134, lifting the side brushes 120 to clear the rail 104' of the adjacent rail conveyor. The right-side brush 120 is also swiveled outward in position to scrub the inner side 117' of the adjacent conveyor's rail 104'. As the rail cleaner 102 enters the two-rail switch section 100, the right-side nozzle 110 on the leading end of the cleaner sprays the top of the rail 104'. And the outer side nozzles 115 on the right side are turned on to direct spray at the inner side 117' of the rail 104'.

Figure 13C:
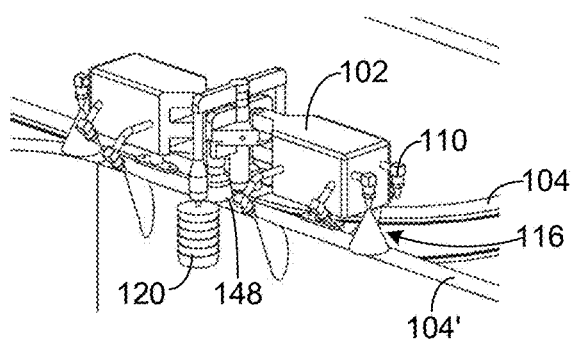

When the cleaner 102 is in the two-rail switch section, the side brushes 120 are in their lowered position to scrub the sides of the rails 104, 104' opposite the inter-rail gap 116, as shown in FIG. 13C. Both rail-top brushes 148 rotate to scrub the tops of both rails 104, 104'. The outer nozzles 115 spray the rail sides 104, 104', and the gap scrub brush (not shown) rotates in the gap 116 to scrub the facing rail sides. As the first rail 104 deviates from the second rail 104' to which the cleaner 102 is switched in this example, the left nozzle 110 is shut off.

Figure 13D:
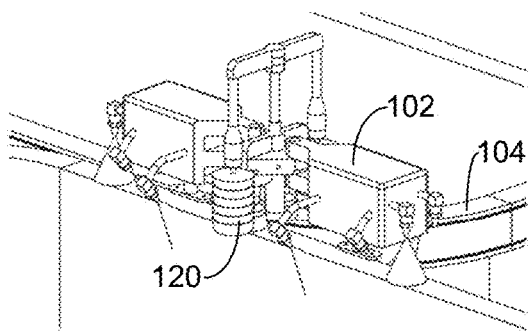
Figure 13E:
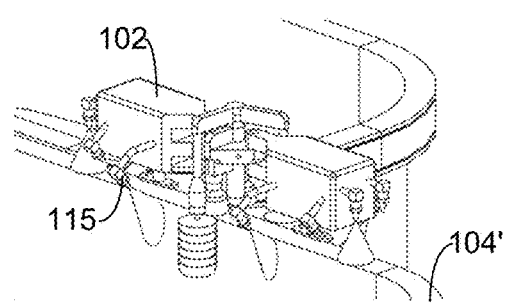
Figure 14:
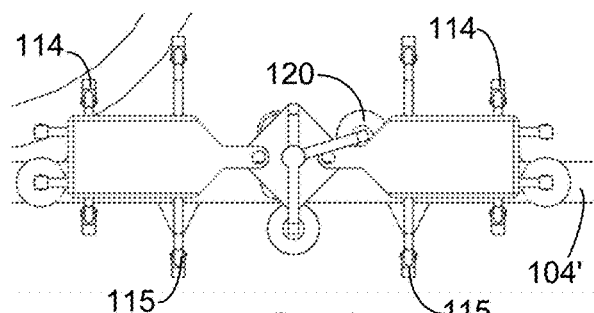
FIG. 14 is a top plan view of the conveyor rail cleaner of FIG. 7 in the position shown in FIG. 13E.

As shown in FIG. 13D, the side scrub brushes 120 are raised by the lift mechanism so that the left-side brush can clear the turn in the first rail 104. Once the cleaner 102 has exited the switch section, as shown in FIGS. 13E and 14, the outer left-side nozzles, the left-side rail-top brush, and the gap brush are turned off. The outer right-side nozzles 115 and the inner left-side nozzles 114 are turned on to spray the left and right sides of the rail 104'. The other side nozzles are turned off. The left-side brush 120 is swiveled into position against the side of the rail 104', and the right-side brush scrubs the other side of the rail 104'.

Figure 15A:
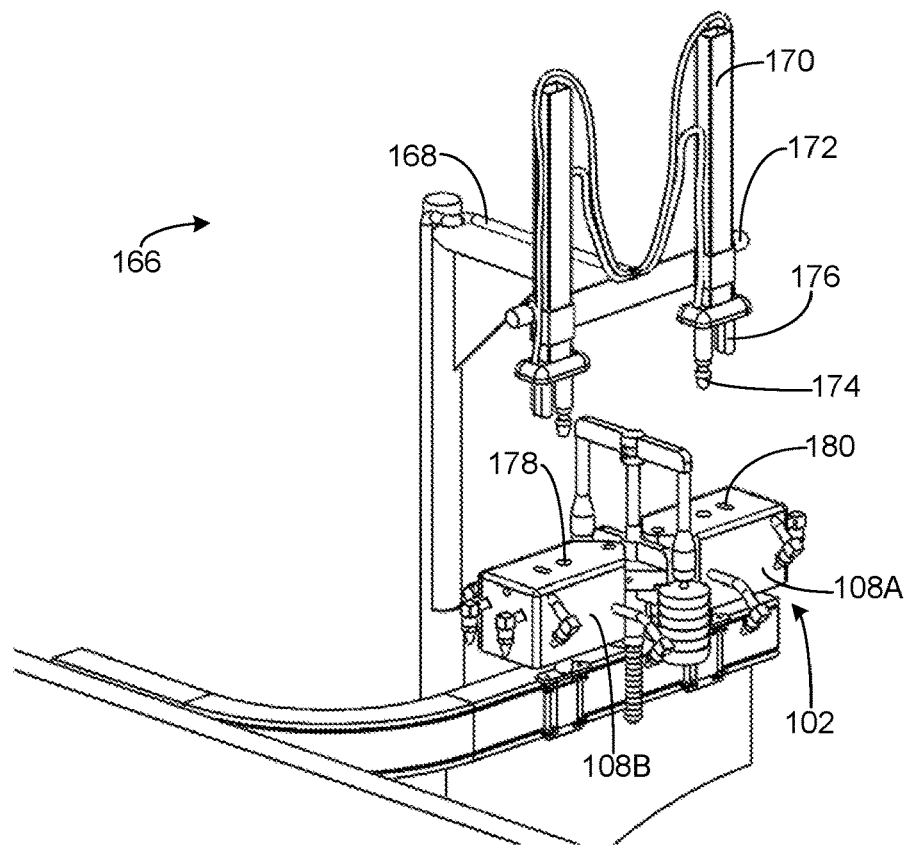
FIGS. 15A and 15B illustrate a sequence of steps followed by a gantry to charge and fill the conveyor-rail cleaner of FIG. 7 on the conveyor rail.
Figure 15B:
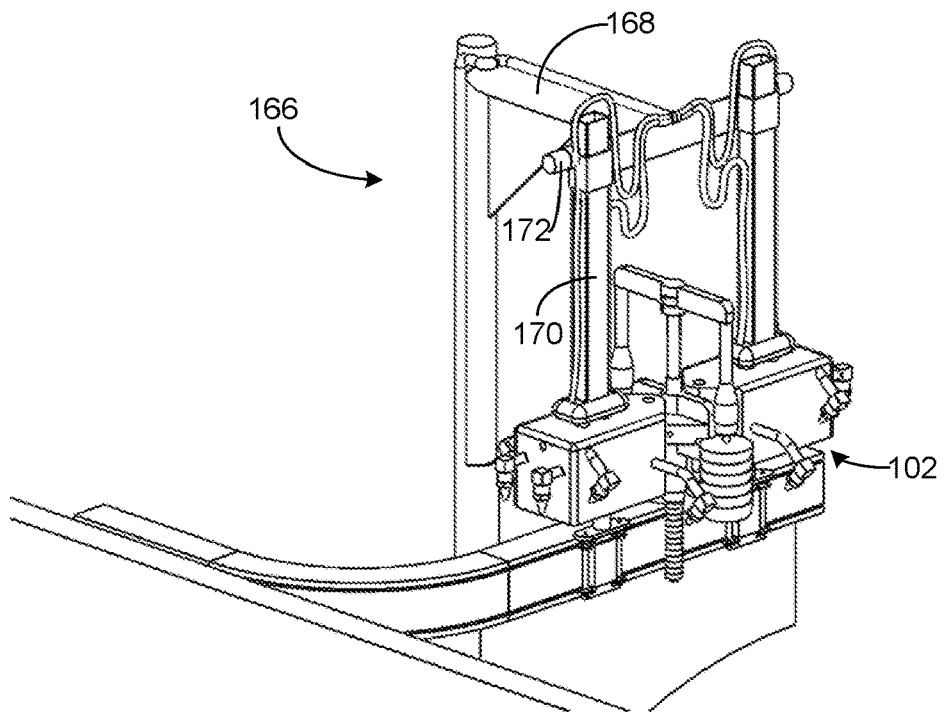

FIGS. 15A and 15B depict the recharging of the battery and the fluid tanks at an inline filling station 166. A gantry 168 suspends two vertically movable legs 170 from a lift driven by motors 172. A fluid injector 174 and a charging plug 176 at the bottom end of each leg 170 are received in filling ports, a fluid fitting 178 and a charging socket 180, in the top side of each cleaning unit 108A, 108B. When it's time for charging, the cleaner 102 is diverted to the inline filling station 166 with the sockets 180 vertically aligned with the plugs 176 and the fittings 178 aligned with the injectors 174. The gantry 168 then lowers the fluid injectors 174 and the charging plugs 176 into the charging and filling position as shown in FIG. 15B. The batteries and the fluid tanks are recharged. The filling station 166 can be located on a dedicated spur track or on a circuit track.

Figure 16:
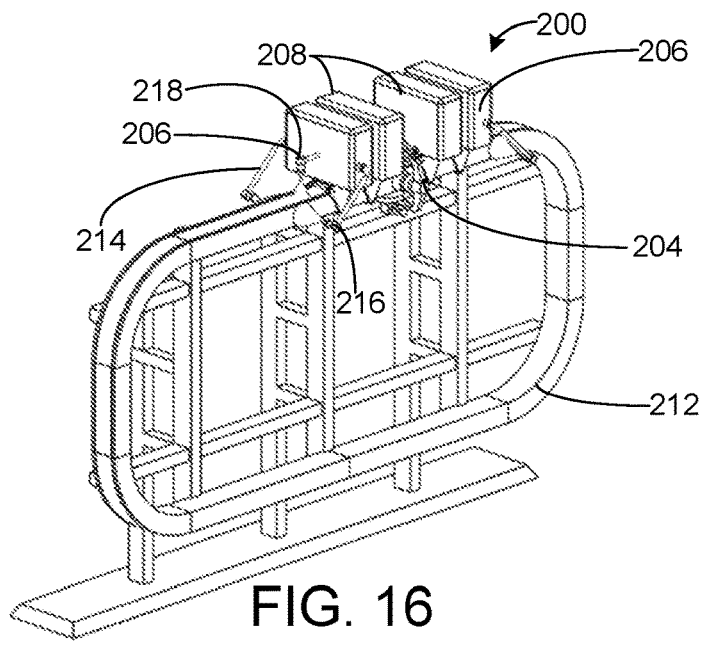
FIG. 16 is an isometric view of a vertical racetrack conveyor being cleaned by another version of a conveyor-rail cleaner embodying features of the invention.
Figure 17:
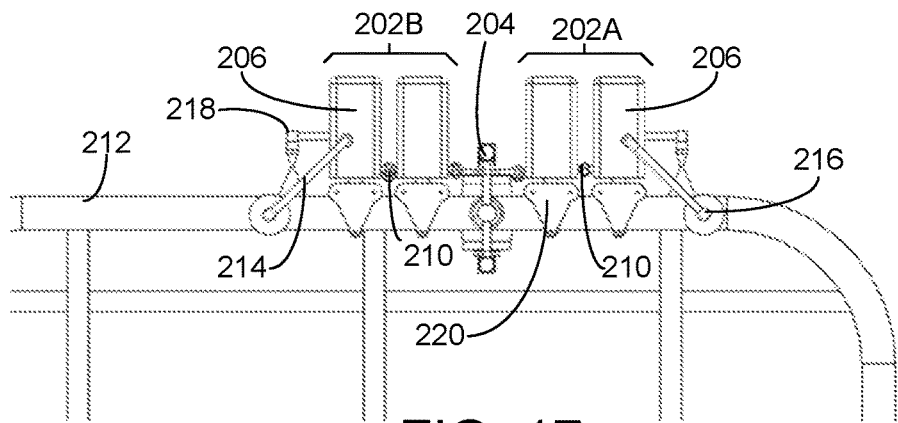
FIG. 17 is a side elevation view of the conveyor-rail cleaner of FIG. 16 on an upper run of the conveyor rail.

FIGS. 16 and 17 show another version of a rail cleaner on a conveyor-rail circuit disposed in a vertical plane rather than a horizontal plane. The rail cleaner 200 includes first and second cleaning units 202A, 202B pivotably joined by an articulation unit 204. Each cleaning unit 202A, 202B includes two housings—a fluid tank 206 and a battery and electronics enclosure 208. The two housings 206, 208 in each cleaning unit 202A, 202B are pivotably connected by couplings 210. In a similar way, the battery and electronics enclosures are joined to the articulation unit. Unlike the previously described cleaners, in which articulation is about a vertical axis, the articulation for the vertical-plane rail conveyor of FIGS. 16 and 17 is about a horizontal axis perpendicular to the vertical plane of the rail 212. Extending from both sides of the fluid tanks 206 are conduits 214 terminating in nozzles 216 directed at the lateral sides of the rail 212. Rail-top nozzles 218 extend outward of the fluid tanks 206 at the front and rear of the cleaner 200 to spray the top of the rail 212. Each of the housings 206, 208 is mounted to a mover 220 that is propelled along the rail 212.

Figure 18:
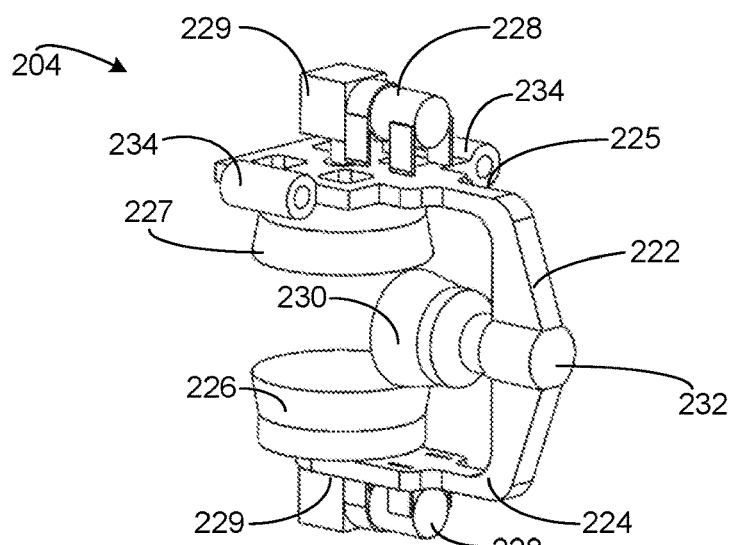
FIG. 18 is an isometric view of the articulation unit of the conveyor-rail cleaner of FIG. 16.

As also shown in FIG. 18, the articulation unit 204 has a U-shaped body 222 with two arms 224, 225. A scrub brush 226 with upward-facing bristles is mounted to the inside of the lower arm 224. Another scrub brush 227 with downward-facing bristles is mounted to the inside of the upper arm 225. Scrub motors 228 and gearboxes 229 mounted on the outside of the arms 224, 225 rotate the brushes 226, 227 to scrub the top and bottom surfaces of the rails. A side scrub brush 230 extends horizontally inward of the base 232 of the U-shaped body 222. The side brush 230 is rotated by a motor (not shown) in the base 232 to scrub the side of the rail 212. Hinge elements 234 couple the articulation unit 204 to the battery and electronic housings 208.

Figure 19A:
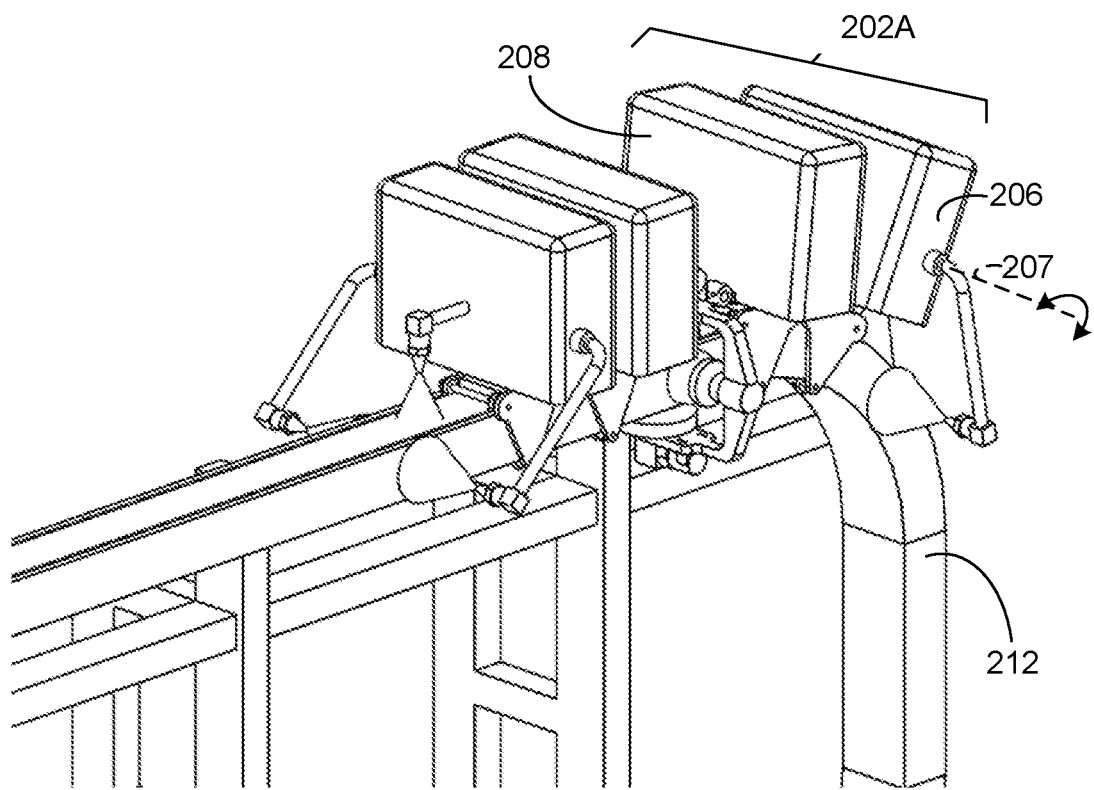
FIGS. 19A and 19B are isometric and side elevation views of the conveyor-rail cleaner of FIG. 16 entering a turn in the conveyor track.
Figure 19B:
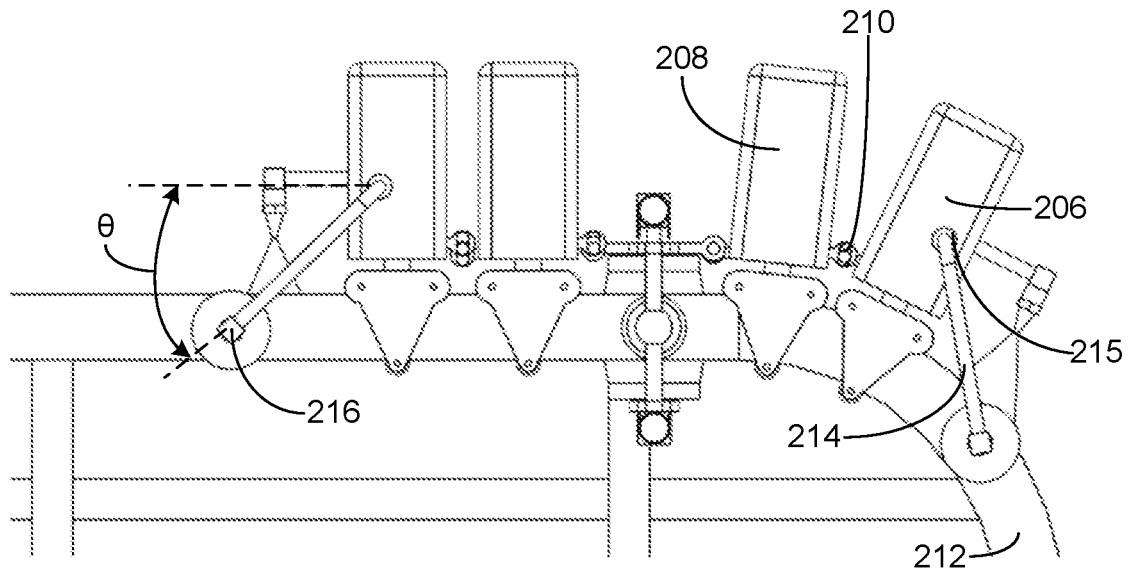

FIGS. 19A and 19B show the articulation of the housings 206, 208 in the lead cleaning unit 202A as it enters a vertical-plane turn in the rail 212. The fluid tank 206 pivots about a horizontal axis at the coupling 210 as it leads the battery and electronics unit 208 into the turn. The side conduits 214 can be rotated about an axis 207 perpendicular to the vertical plane and concentric with the conduits at their point of entry to the fluid tank. The conduits 214 are driven by rotatory actuators 215 so that the nozzles 216 are directed at the median of the vertical face of the rail 212 and the spray direction at the rail is maintained as the rail cleaner articulates through the turn. Level sensors in the housings 206 dictate a conduit angle $\theta$ to predefined settings for the rotating actuators 215 to adjust the conduit angle and the direction of the nozzles 216 in the turn.

Figure 20A:
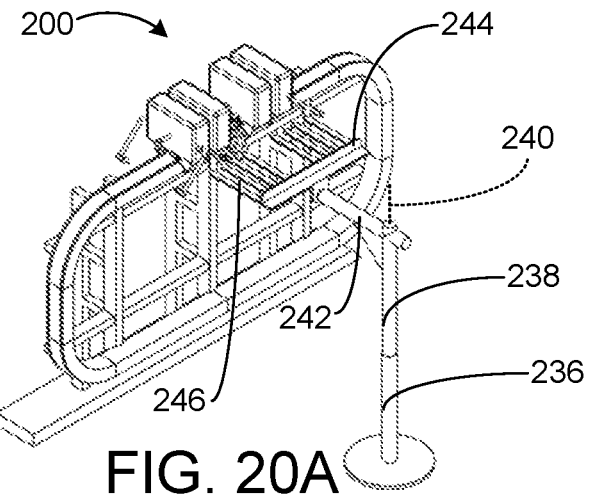
FIGS. 20A-20C illustrate a sequence of steps followed by a lifter to remove the cleaning portion of the conveyor-rail cleaner of FIG. 16 from the conveyor track.
Figure 20B:
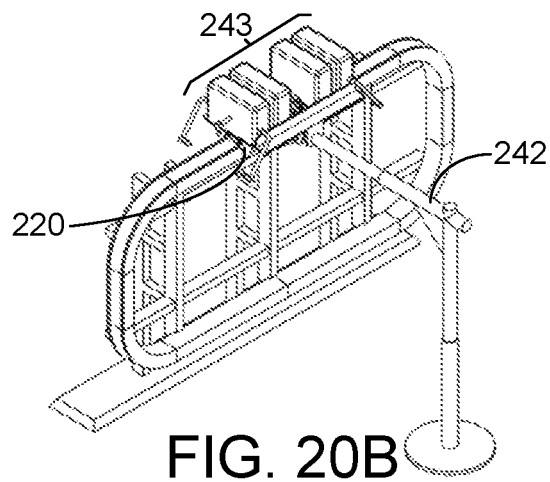
Figure 20C:
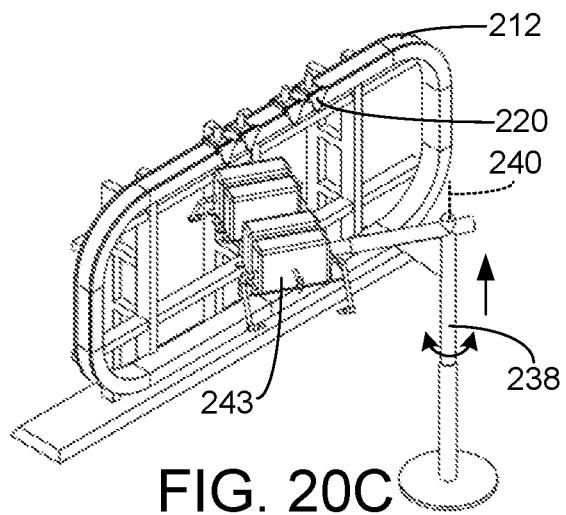

FIGS. 20A-20C depict the sequence of removing the cleaning portion 243 of the conveyor-rail cleaner 200 from the movers 220. A separation tool in the form of a crane 236 pivots an extensible arm 238 about a vertical axis 240. The upper end of the arm is joined to one end of a telescoping boom 242. At the other end of the boom 242 is a fork 244 with multiple tines 246. When the conveyor-rail cleaner 200 is at an unloading position as in FIG. 20A, the boom 242 is turned into position facing the cleaner 200. Then, as shown in FIG. 20B, the telescoping boom 242 pushes the fork 244 into position between the movers 220 and the cleaning portion 243 of the cleaner 200. As shown in FIG. 20C, the arm 238 is extended upward to lift the cleaning portion 243 from the movers 220. Then the arm 238 is rotated about its vertical axis 240 to swing the cleaning portion 243 away from the rail 212 to a loading station (not shown) to be recharged and refilled.

Figure 21:
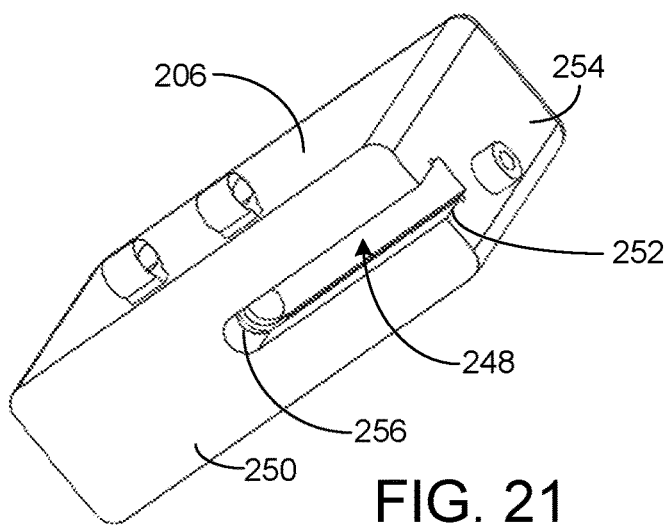
FIG. 21 is a bottom isometric view of a fluid tank of a cleaning unit for the conveyor-rail cleaner of FIG. 16.
Figure 22A:
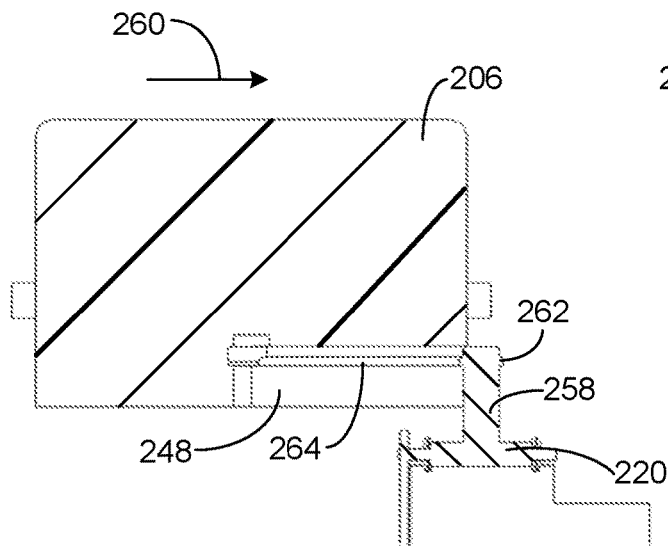
FIGS. 22A-22C are cross sections of a fluid tank of the conveyor-rail cleaner of FIG. 16 showing the sequence of attaching the tank to a mover.
Figure 22B:
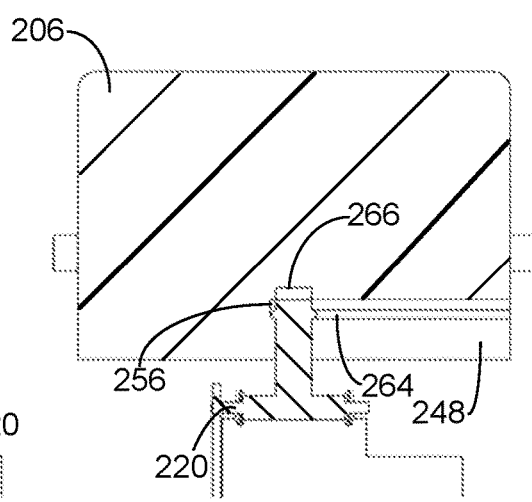
Figure 22C:
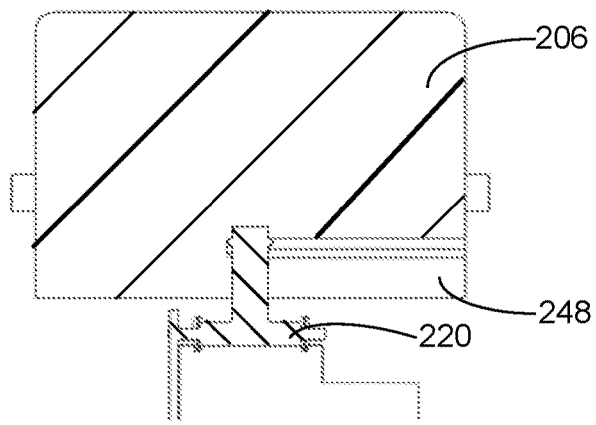

Attachment structure at the bottom of a fluid tank 206 as in FIG. 19A is shown in FIG. 21. The tank's attachment structure includes a slot 248 in the bottom side 250 of the tank 206. The slot 248 has an open end 252 opening onto one lateral side 254 of the tank 206. The slot 248 terminates in a blind end 256 near the lateral center of the tank 206. The connection of the tank 206 to the mover 220 is shown in FIGS. 22A-22C. A pin 258 extends upward from the mover 220. The slot 248 in the tank 206 is complementary in shape to the shape of the pin 258. The pin 258 is aligned with the slot 248. The tank 206 is pushed in the direction of the arrow 260 so that the pin 258 rides along the slot 248 until the pin is at the slot's blind end 256 as in FIG. 22B. A ring 262 around the head of the pin 258 is received in notches 264 in the sides of the slot 248. Once the pin 258 is at the blind end 256 of the slot 248, the tank 206 is lowered so that the head of the pin 258 is received in a cavity 266 that branches off from the blind end 256 into the interior of the tank housing, as shown in FIG. 22C. The cavity 266 is wide enough to accommodate the pin's ring 262. The tank 206 is released from the mover 220 by reversing the sequence of steps shown in FIGS. 22A-22C. The same slot structure is formed in the housing for the battery and electronics.

Although features of the invention have been described in detail with respect to a few specific versions, other versions are possible. For example, the permanent magnets in the movers could be replaced by electrically conductive material to form linear-induction motors with the rail stators, instead of the linear-synchronous motors described. As another example, the rail-cleaners could include more or fewer tanks and enclosures than described. And each of the cleaning units could include multiple fluid tanks, such as one tank holding a cleansing detergent solution and another tank holding a rinsing agent such as water. In that way the conveyor-rail cleaner can be run in either direction with the leading cleansing unit spraying cleanser and the trailing unit spraying a rinsing agent. And the movers could be unitarily formed with the cleaning units. As another example, instead of a pump for each nozzle, a single pump with multiple valves could be used to turn nozzles on and off individually. And scrub brushes could be mounted on the cleaning units as cleaning elements instead of or in addition to the spray nozzles. So, as these few examples suggest, the claims are not meant to be limited to the details of the exemplary embodiments.

What is claimed is:

1. A conveyor-rail cleaner comprising:
   a first cleaning unit having a left side and a right side and a first end and a second end;
   a second cleaning unit having a left side and a right side and a first end and a second end pivotably connected to the second end of the first cleaning unit;
   wherein the first and second cleaning units have cleaning elements;
   a fluid tank in each of the first and second cleaning units and wherein the cleaning element in each of the first and second cleaning units is a nozzle at the first end in fluid communication with the fluid tank.

2. The conveyor-rail cleaner of claim 1 wherein each of the first and second cleaning units includes a first lateral fluid nozzle at the left side in fluid communication with the fluid tank and a second lateral fluid nozzle at the right side in fluid communication with the fluid tank.

3. The conveyor-rail cleaner of claim 2 wherein each of the first and second cleaning units includes:
   a first conduit connected between the first lateral fluid nozzle and the fluid tank;
   a second conduit connected between the second lateral fluid nozzle and the fluid tank;
   a first rotary actuator coupled to the first conduit to adjust the angle of the first conduit as the first cleaning unit negotiates a turn in a vertical plane;
   a second rotary actuator coupled to the second conduit to adjust the angle of the second conduit as the second cleaning unit negotiates a turn in a vertical plane.

4. The conveyor-rail cleaner of claim 1 comprising an articulation unit pivotably connected to the second end of the first cleaning unit and to the second end of the second cleaning unit to provide the pivotable connection between the first and second cleaning units.

5. The conveyor rail-cleaner of claim 4 wherein the articulation unit includes one or more scrub brushes.

6. The conveyor rail-cleaner of claim 5 wherein the one or more scrub brushes in the articulation unit are retractable from a cleaning position to a retracted position.

7. The conveyor-rail cleaner of claim 5 comprising a battery in one or more of the first or second cleaning units and wherein the articulation unit includes one or more motors each connected to one of the one or more scrub brushes and selectively coupled to the battery to rotate the one or more scrub brushes.

8. The conveyor-rail cleaner of claim 4 wherein the articulation unit includes:
   a central structure;
   a left arm and a right arm depending from the central structure;
   a scrub brush at the distal end of each of the left and right arms.

9. The conveyor-rail cleaner of claim 8 wherein the articulation unit includes a lift selectively raising and lowering the left and right arms.

10. The conveyor-rail cleaner of claim 8 wherein the articulation unit includes a first swivel selectively swiveling the left arm to move the scrub brush from a first left position to a second left position and a second swivel selectively swiveling the right arm to move the scrub brush from first right position to a second right position.

11. The conveyor rail cleaner of claim 1 wherein the first cleaning unit includes two fluid tanks pivotably coupled together and wherein the second cleaning unit includes two fluid tanks pivotably coupled together.

12. A conveyor-rail cleaner comprising:
   a first cleaning unit having a left side and a right side and a first end and a second end;
   a second cleaning unit having a left side and a right side and a first end and a second end pivotably connected to the second end of the first cleaning unit;
   wherein the first and second cleaning units have cleaning elements;
   one or more conveyor-rail movers propelled along a conveyor rail and wherein the first and second cleaning units each have a top side and a bottom side and attachment structure in the bottom side for attachment to the one or more conveyor-rail movers.

13. A cleanable conveyor system comprising:
a conveyor rail;
a conveyor-rail cleaner including:
   one or more movers movable along the conveyor rail;
   one or more cleaning units detachably connected to the one or more movers and having cleaning elements arranged to clean the conveyor rail; and
   a fluid tank in each of the one or more cleaning units and wherein the cleaning element in each of the one or more cleaning units is a nozzle in fluid communication with the fluid tank and directed to spray fluid from the tank onto the conveyor rail.

14. The cleanable conveyor system of claim 13 further comprising a brush in each of the one or more cleaning units arranged to scrub the conveyor rail.

15. The cleanable conveyor system of claim 13 comprising a filling station having an injector for dispensing fluid and wherein the fluid tank in each of the one or more cleaning units has a fluid fitting receiving the injector supplying the fluid tank with fluid.

16. The cleanable conveyor system of claim 15 wherein the filling station includes a gantry plugging the injector into the fluid fitting while the conveyor-rail cleaner is on the conveyor rail.

17. The cleanable conveyor system of claim 15 comprising a separation tool for detaching the one or more cleaning units from the one or more movers and moving the one or more cleaning units from the conveyor rail to the filling station where the fluid fitting receives the injector supplying the fluid tank with fluid.

18. The cleanable conveyor system of claim 15 wherein the filling station includes a charging plug and wherein the one or more conveyor-rail cleaners include a rechargeable battery and a charging socket receiving the charging plug to charge the rechargeable battery.

19. The cleanable conveyor system of claim 13 wherein the conveyor rail includes a linear-motor stator and wherein the one or more movers are propelled by the stator along the conveyor rail.

* * * * *